(12) United States Patent
Hara et al.

(10) Patent No.: US 6,201,365 B1
(45) Date of Patent: Mar. 13, 2001

(54) DRIVE UNIT WITH COOLANT FLOW THROUGH A SPACE SEPARATING AN INVERTER FROM A CASING HOUSING AN ELECTRIC MOTOR

(75) Inventors: Takeshi Hara; Yutaka Hotta; Masayuki Takenaka; Hiromichi Agata; Kozo Yamaguchi; Takahiro Kido; Naruhiko Kutsuna, all of Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/558,163

(22) Filed: Apr. 26, 2000

(30) Foreign Application Priority Data

Apr. 27, 1999 (JP) .................................................. 11-120286
Dec. 15, 1999 (JP) .................................................. 11-356734
Mar. 24, 2000 (JP) .................................................. 12-088590

(51) Int. Cl.[7] .............................. H02K 9/19; B60K 6/00
(52) U.S. Cl. .......................... 318/558; 318/139; 363/141; 310/54
(58) Field of Search ................................... 318/139, 801, 318/471, 538, 558; 388/934; 363/141; 310/52, 54, 58, 59

(56) References Cited

U.S. PATENT DOCUMENTS

| 4,711,204 | * | 12/1987 | Rusconi ............................ 123/142.5 |
| 5,631,821 | * | 5/1997 | Muso .................................... 363/141 |
| 5,670,860 | * | 9/1997 | Conrady et al. .......................... 320/2 |
| 5,905,647 | * | 5/1999 | Shirai ................................... 363/141 |
| 6,000,912 | * | 12/1999 | Takada et al. .......................... 417/32 |

FOREIGN PATENT DOCUMENTS 7-099750   4/1995   (JP) .
7-288949   10/1995   (JP) .

* cited by examiner

*Primary Examiner*—Bentsu Ro
(74) *Attorney, Agent, or Firm*—Lorusso & Loud

(57) ABSTRACT

A drive unit which uses an electric motor as a power source and has an integrated inverter, with a cooling circuit for the electric motor and the inverter. The drive unit includes a drive unit case, the electric motor housed within the case, and the inverter fixed to the case. A coolant flow passage is provided between the drive unit case and the inverter. The inverter is fixed to the drive unit case through a panel wall, and a partition divides the coolant flow passage into chambers which are coextensive in parallel. As a result, the coolant which flows through the coolant flow passage acts as a two-stage heat shield, barring the heat generated by the electric motor from being transmitted to the inverter.

14 Claims, 17 Drawing Sheets

DRIVE UNIT WITH COOLANT FLOW THROUGH A SPACE SEPARATING AN INVERTER FROM A CASING HOUSING AN ELECTRIC MOTOR

BACKGROUND OF THE INVENTION

1. Technical Field of the Invention

The present invention relates to a drive unit in which an electric motor is used as a power source, and more particularly, to a cooling system in a drive unit for an electric vehicle or a hybrid drive unit.

2. Related Art

When an electric motor is used as a drive source for a vehicle, the load exerted on the electric motor varies significantly according to the running conditions. Accordingly, in order to manage the heat generated under a heavy load, cooling is necessary. Also, an electric motor requires a controller, e.g., an inverter in the case of an alternating current electric motor. Since a controller such as an inverter is connected to the electric motor with a power cable, it can be separated from the electric motor and mounted in an appropriate position. However, for mounting convenience in a vehicle, arrangements have also been used in which the inverter is integrated with the electric motor.

However, when the controller is integrated with the electric motor, not only does the temperature of the controller rise due to the heat generated by its own elements, but it is also affected by the heat from the electric motor and therefore requires cooling. Therefore, conventionally, where an electric motor has an integrated inverter, a heat sink for mounting the inverter is attached to a drive unit case, and a cooling water channel is formed between the heat sink and the drive unit case so as to simultaneously cool the motor and the inverter (see Japanese Patent Application Laid-Open No. 7-288949).

However, according to the conventional art construction as described above, because the same cooling water simultaneously cools the inverter and the electric motor, there is a problem of the heat from the electric motor being transferred to the inverter by the cooling water and the case.

SUMMARY OF THE INVENTION

Accordingly, an objective of the present invention is to prevent the heat of the electric motor from transferring to the inverter in a drive unit in which the electric motor and the inverter are cooled with a common coolant.

In order to achieve the foregoing objective, the present invention provides a drive unit comprising an electric motor; a drive unit case for accommodating the electric motor; an inverter fixed to the drive unit case for controlling the electric motor; and a flow passage for coolant for cooling the electric motor. The inverter is fixed to the drive unit case through an inverter panel, and a first chamber on the inverter side and a second chamber on the drive unit case side, divided by a partition wall, are arranged between the drive unit case and the inverter panel and are in communication with the coolant flow passage.

In the arrangement described above, the first chamber and the second chamber are preferably separated by an independent isolating means (partition wall) disposed on the inverter panel.

It is also preferred that the first chamber and the second chamber be in communication, in series, with the coolant flow passage, with the first chamber side disposed furtherest upstream.

Alternatively, the first chamber and the second chamber may communicate in parallel with the coolant flow passage.

It is also effective to arrange the above-described unit with the first chamber and the second chamber separated by an independent isolating means (partition) which prevents contact between the inverter panel and the drive unit case. Preferably, in such an embodiment, the isolating means is formed of a material having low heat conductivity.

In another preferred embodiment the inverter panel is constructed in the shape of a lid which contains the first chamber and the second chamber and which covers the drive unit case, the isolating means for separating the first chamber and the second chamber is disposed on the inverter side.

In yet another preferred embodiment the inverter panel is constructed in the shape of a lid which houses the first chamber and covers the drive unit case, and the independent isolating means (partition wall) for separating the first chamber and the second chamber is supported between the drive unit case and the inverter panel so as to prevent contact between the inverter panel and the drive unit case.

Furthermore, the isolating means which serves to separate the first chamber and the second chamber is preferably disposed nearer to the inverter than the drive unit case.

Because the space for coolant between the electric motor and the inverter is divided into two passages, one on the motor side and another on the inverter side, the coolant which flows therein acts as two heat insulating layers and it is possible to block the heat on the motor side, which becomes hotter than the inverter side, by absorbing it in two steps within the coolant space. Accordingly, it is possible to inhibit transfer of the heat from the motor to the inverter, and thus prevent the temperature of the inverter from rising due to the integration of the motor and the inverter.

Further, in the preferred embodiment wherein the isolating means is disposed on the inverter panel side, the isolating means serves as a barrier to heat transfer from the electric motor, and it is possible to inhibit heat transfer from the electric motor to the coolant which flows in the first chamber on the inverter side.

With the preferred embodiment wherein the first and second cooling chambers are connected in series with each other, it is possible to prevent the heat of the electric motor from transferring to the inverter through the coolant because the coolant flows so as to cool the electric motor after cooling the inverter.

On the other hand, with the first and second cooling chambers connected in parallel, it is possible to prevent the heat of the electric motor from transferring to the inverter through the coolant because the coolant flows independently through the first and second chambers, respectively.

In embodiments wherein the isolating means is an independent member and is disposed between the drive unit case and the inverter panel, the isolating means (partition) serves to insulate the inverter panel from the drive unit case and prevents heat transfer directly from the drive unit case to the inverter panel through their connecting portions.

In a preferred embodiment the inverter panel is formed as a lid defining both the first and second coolant chambers. In such an embodiment, the structure of the drive unit case can be simplified so that the inverter and the motor can be cooled with a simple structure. Moreover, since the isolating means is on the inverter panel, transfer of heat from the motor to the coolant which flows through the first chamber on the inverter side is inhibited by the isolating means.

Also, in preferred embodiments wherein the inverter panel contains the first chamber and wherein the isolating means is an independent member and is supported between connecting portions of the drive unit case and the partition wall, the isolating means serves as a heat insulator, impeding heat transfer between the connecting portions of the drive unit case and the inverter panel.

In preferred embodiments wherein the isolating means is closer to the inverter panel than to the surface portion of the drive unit case corresponding to the second chamber, the inverter panel may include a flange portion extending, beyond the isolating means, to the drive unit case to further suppress heat transfer to the inverter.

The teaching of Japanese Application No. 11-120286, filed Apr. 27, 1999, Japanese Application No. 11-356734, filed Dec. 15, 1999 and Japanese Application No. 2000-88590, filed Mar. 24, 2000, inclusive of their specifications, claims and drawings are incorporated herein in their entirety.

PREFERRED EMBODIMENTS OF THE INVENTION

Preferred embodiments of the present invention will hereinafter be described with reference to the drawings.

Figure 1:
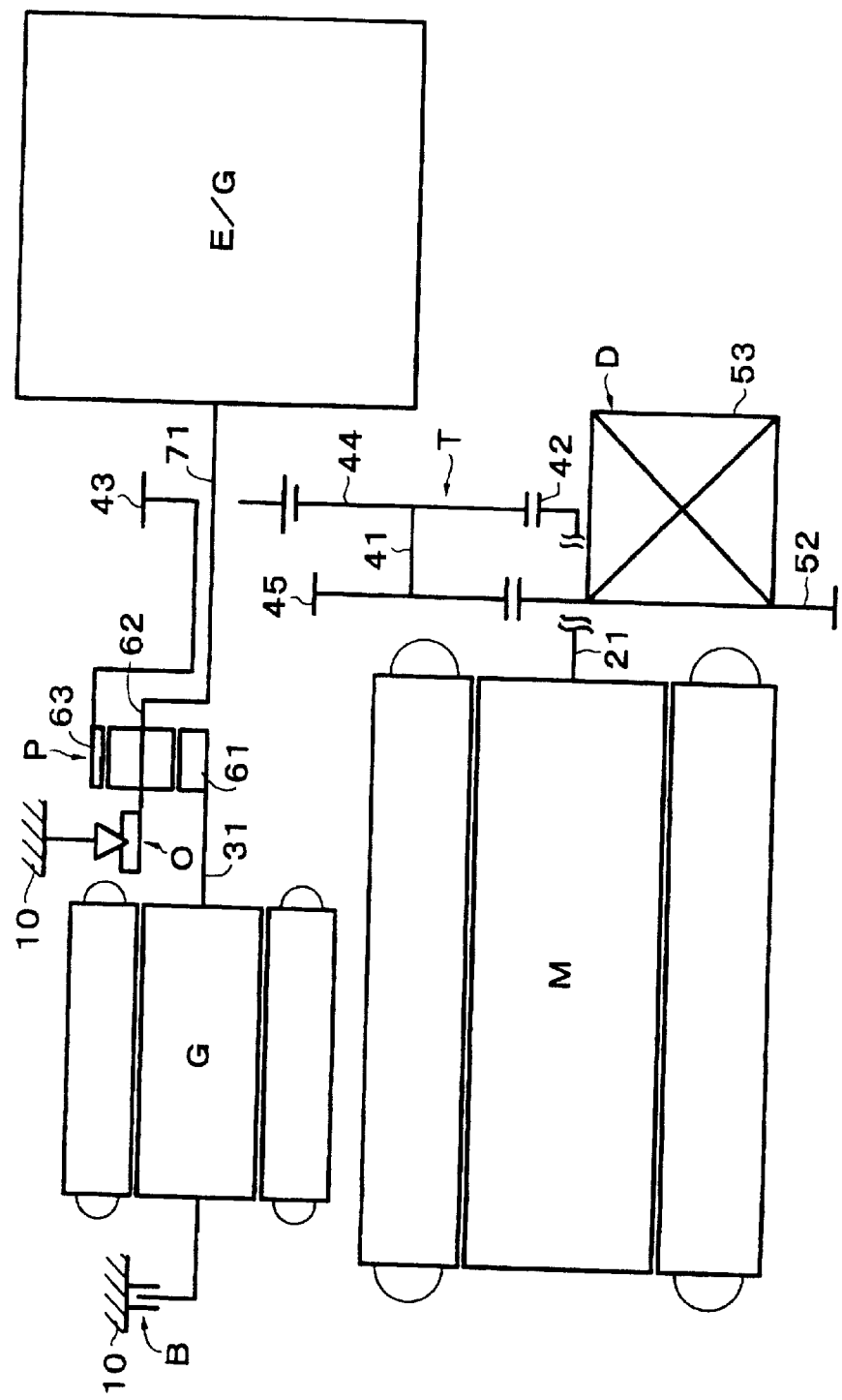
FIG. 1 is a schematic view of a first embodiment of the present invention applied to a hybrid drive unit.

FIG. 1 shows a first preferred embodiment of the present invention applied to a hybrid drive unit. This unit has, as its principal elements, an internal combustion engine (hereinafter referred to as "engine") E/G, an electric motor (hereinafter referred to as "motor") M, an electric generator (hereinafter referred to as "generator") G, and a differential D, with a planetary gear set P of a single pinion construction and a counter gear mechanism T being interposed between them. Furthermore, a one-way clutch O and a brake B are also provided.

Figure 2:
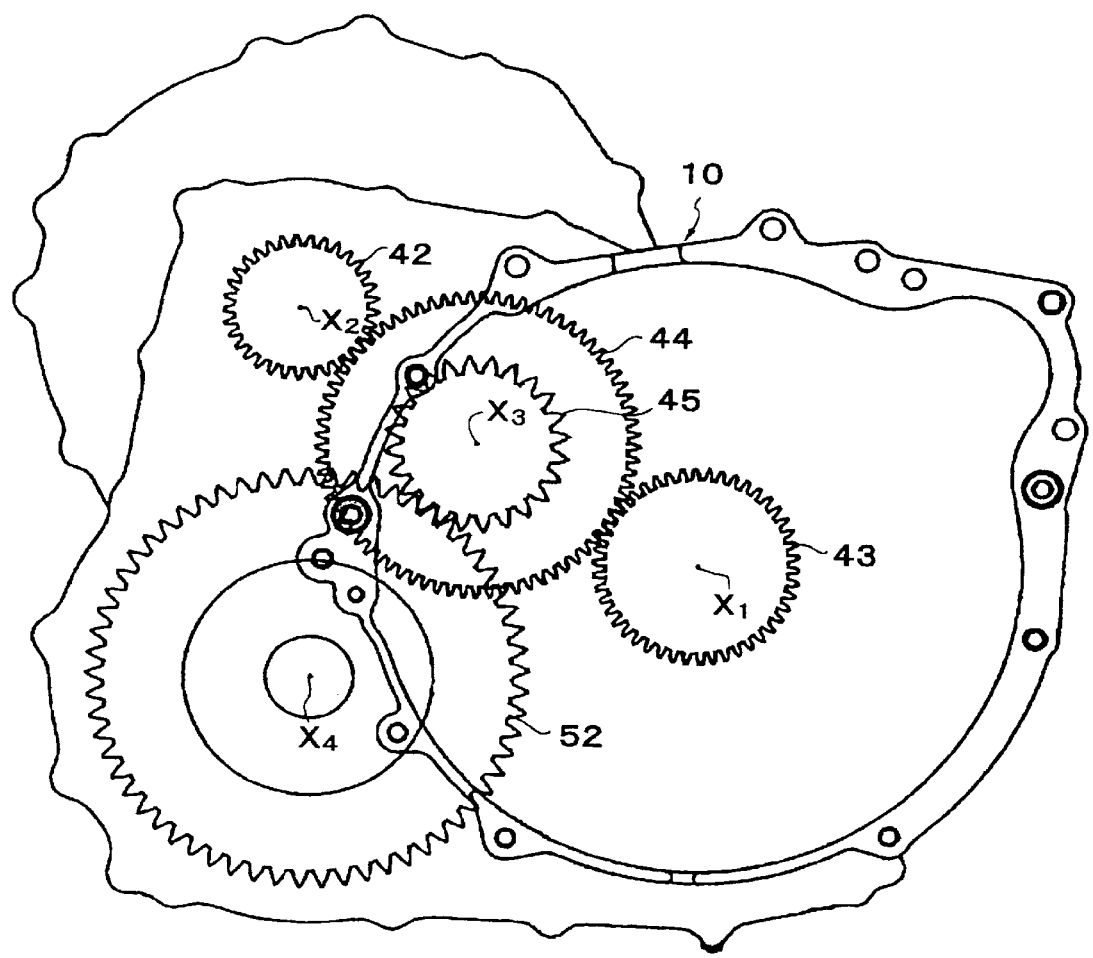
FIG. 2 is a side view showing the relationship between the axes of the various shafts of the drive unit of the first embodiment.

As illustrated in FIG. 2, the drive unit is of a four-axes construction in which the engine E/G and the generator G are located on a first axis $X_1$, the motor M is located on a second axis $X_2$, the counter gear mechanism T is located on a third axis $X_3$, and the differential D is located on a fourth axis $X_4$, respectively. The engine E/G and the generator G are connected with the differential D through the planetary gear set P and the counter gear mechanism T. The motor M is connected with the differential D through the counter gear mechanism T.

The motor M is connected with the counter gear mechanism T by meshing engagement of a counter-drive gear 42 fixed to a rotor shaft 21 of the motor M with a counter-driven gear 44. The engine E/G is connected with the generator G and the counter gear mechanism T by connection of its output shaft 71 with a carrier 62 of the planetary gear set P. The generator G is connected to the engine E/G and the counter gear mechanism T through a sun gear 61 of the planetary gear set P, the sun gear 61 being fixed on its rotor shaft 31. A ring gear 63 of the planetary gear set P is connected with a counter-drive gear 43 on the first axis $X_1$ meshing with the counter-driven gear 44 of the counter gear mechanism T. The counter gear mechanism T includes a counter-driven driven gear 44 fixed to a counter shaft 41, and a differential drive pinion gear 45. The differential drive pinion gear 45 meshes with a differential ring gear 52 fixed to a differential case 53 of the differential D. The differential D is connected with the wheels (not shown), as is conventional.

The one-way clutch O is arranged with its inner race connected to the carrier 62 and its outer race connected to the drive unit case 10 so as to prevent reverse rotation of the carrier 62 by reactive force with a drive unit case 10. Also, the brake B is provided so as to lock the rotor shaft 31 of the generator G with the drive unit case 10 when necessary to prevent drive loss due to its rotation by the reaction torque when electric generation is unnecessary. The brake B is arranged so that a brake hub is connected with the rotor shaft 31, and a friction engaging member engages the brake hub with the drive unit case 10.

In a drive unit of the type described above, though there is a speed reduction by the counter gear mechanism T between the motor M and the wheels, the motor M and the wheels are directly connected in terms of motive force transmission. In contrast, the engine E/G and the generator G are connected together indirectly in terms of motive force transmission, through the planetary gear set P and counter gear mechanism T. As a result, by adjusting the load of the generator G on the ring gear 63, which sustains the vehicle running load through the differential D and the counter gear mechanism T, running with an appropriately adjusted ratio utilizing the engine output for the driving force and energy generation (battery charging) becomes possible. Also, because the reactive force applied to the carrier 62 is reversed by driving the generator G as a motor, the reversed reactive force functions to lock the carrier 62 to the drive unit case 10 through the one-way clutch O so that the output of the generator G can be transmitted to the ring gear 63, thereby making it possible to increase the driving force at vehicle take-off by simultaneous output of the motor M and the generator G (running in a parallel mode).

Figure 3:
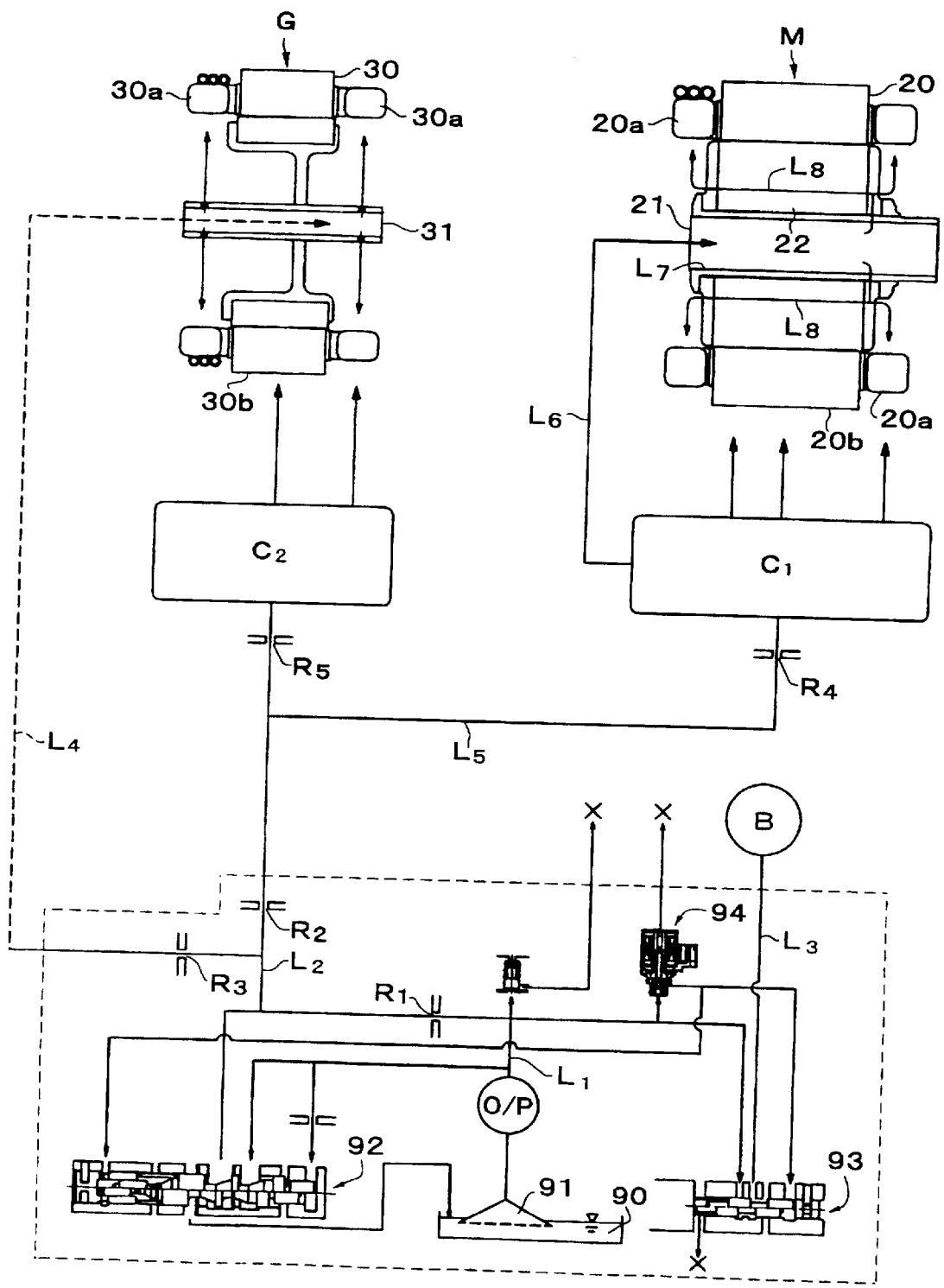
FIG. 3 is a circuit diagram of a hydraulic circuit of the drive unit of the first embodiment.

FIG. 3 shows the hydraulic circuit of the above-described hybrid drive unit. This hydraulic circuit includes, as its major elements, an oil sump 90 in the bottom of the drive unit case 10, an electric oil pump O/P which sucks up oil through a strainer 91 from the oil sump 90 and discharges it into the circuit, a regulator valve 92 which establishes the circuit line pressure, a brake valve 93 for controlling engagement/disengagement of the brake B, and a solenoid valve 94 for controlling switching of the brake valve 93. Thus, this circuit operates as a control circuit for feeding oil to the circulation passage supply oil passage $L_2$ wherein it serves both as a coolant for cooling the motor M and the generator G and as a lubricant. The hydraulic control circuit shown in FIG. 3 also controls communication of a hydraulic servo supply oil passage $L_3$ of the brake B with the line pressure oil passage $L_1$ and with a drain "X".

The line pressure oil passage $L_1$ on the discharge side of the oil pump O/P is branched, with one branch connected to the supply oil passage $L_2$ which is in the circulation path passing through the regulator valve 92, and the other branch connected to the supply oil passage $L_3$ which supplies/drains oil to/from the hydraulic servo of the brake B through the brake valve 93. The line pressure oil passage $L_1$ and the supply oil passage $L_2$ are connected together through an orifice $R_1$. The supply oil passage $L_2$ of the circulation path is branched, with the branches passing through orifices $R_2$, $R_3$, respectively. One branch is connected to the oil passage in rotor shaft 31 of the generator G through an oil passage $L_4$ in the case, as shown by the broken line, and the other branch is further branched at an oil passage $L_5$ in the case, with one branch connected to an oil reservoir $C_1$ for the motor M and the other branch connected to an oil reservoir $C_2$ for the generator G, provided in the upper part of the drive unit case, through orifices $R_4$, $R_5$, respectively.

For cooling of the motor M, oil is fed to oil passage $L_7$ in the rotor shaft 21 from the coolant reservoir $C_1$ through an oil passage $L_6$. From passage $L_7$ the oil passes through an oil passage $L_8$ in the rotor 22, the details of which will be illustrated later, and is discharged by centrifugal force generated by the rotation of the rotor 22 toward a coil ends 20a of the stator 20. In this way, by passing through the oil passage $L_8$ in the rotor 22, the rotor side is cooled. Further, coil ends 20a at opposing ends of the rotor 22 are cooled by the oil discharged from both ends of the rotor 22. Oil is also discharged directly from the coolant container $C_1$ onto stator core 20b and the coil ends 20a. In the same manner, cooling of the generator G is effected by the oil discharged by centrifugal force from the oil passage in the rotor shaft 31 of the generator G through the radial oil hole, onto the coil ends 30a at opposing ends of the stator 30, and by the oil discharged from the coolant container $C_2$ onto the stator core 30b and coil ends 30a. The oil which has thus cooled the motor M and the generator G drops into the bottom part of the drive unit case or runs down along the case wall so as to be recovered in the oil sump 90 disposed underneath the drive unit.

Figure 4:
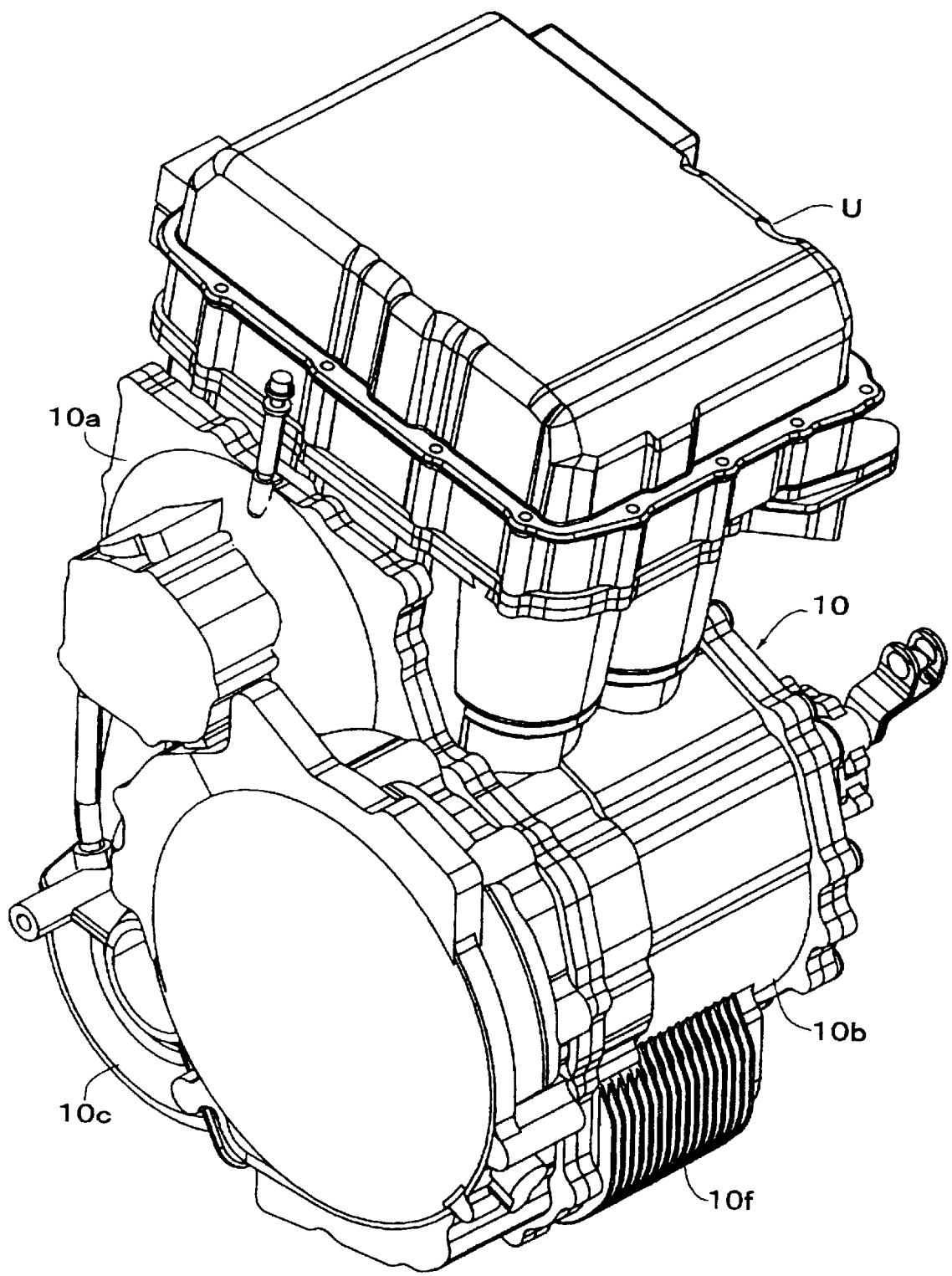
FIG. 4 is a perspective view of the drive unit with an integrated inverter in the first embodiment of the present invention.

As shown in FIG. 4, the exterior of the drive unit case 10, outside the oil sump, has a large number of integrally formed heat radiation fins of aluminum material or the like, so that the oil recovered in the oil sump is air-cooled by airflow in the engine compartment. In FIG. 4, a reference numeral 10a denotes a motor accommodating portion in the drive unit case, 10b denotes a generator accommodating portion, and 10c denotes a differential accommodating portion. An inverter U (hereinafter referred to as "inverter", a general term inclusive of motor inverters and generator inverters) for controlling the motor and the generator is, as shown in FIG. 4, mounted on and integrated with the upper part of the drive unit case 10.

In the present specification, the term "inverter" means a power module inclusive of a switching transistor and accompanying circuit elements for converting the direct current of a battery power source into alternating current (three-phase alternating current when the motor is a three-phase A/C motor) and a circuit substrate upon which these elements are arranged.

Figure 5:
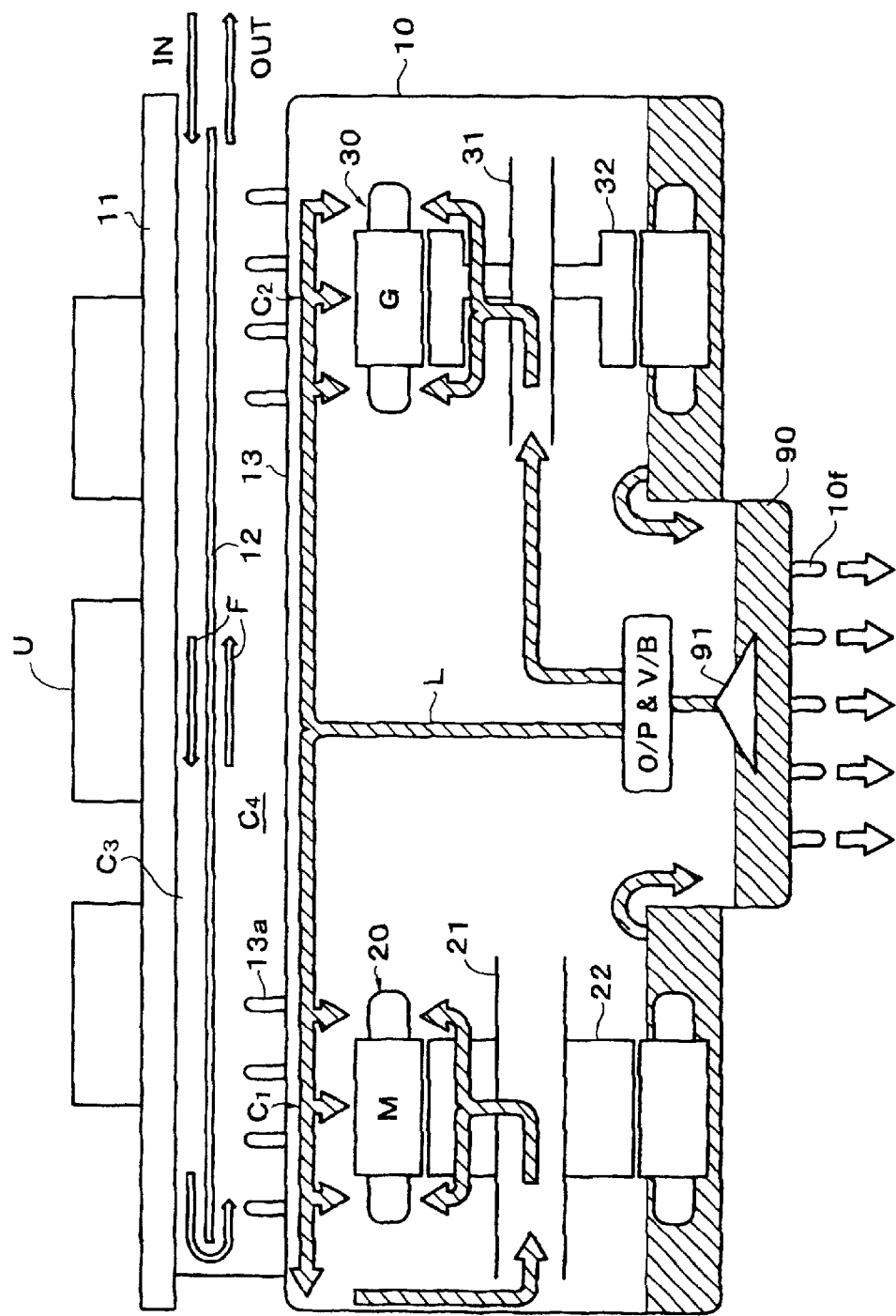
FIG. 5 is a schematic diagram showing, conceptually, a cooling system of the first embodiment.

FIG. 5 shows the cooling system as including an oil circulation path L (L is shown by the wide arrows with hatching in the figure) utilizing oil as the first coolant and a water passage F (shown by the thin white arrows in the figure) utilizing cooling water as the second coolant.

The oil (first coolant) is taken up by the oil pump O/P from the oil sump 90 through the strainer 91, and cools the generator G and the motor M in the sequence as previously described, after which it first collects in the bottom of the generator G accommodating portion and the bottom of the motor M accommodating portion of the drive unit case 10 wherein it maintains a certain oil level that does not come into contact with the lowermost part of the rotors 22 and 32, and then the overflows into the oil sump 90, thereby completing one circulation cycle.

The cooling water (second coolant) serves to cool the oil, by circulation through path F in the space between the inverter panel 11, which is formed of an aluminum material or the like having good heat conductivity, and a wall portion 13 of drive unit case 10. The inverter panel 11 also provides a mounting surface for the inverter U of an independent construction. In this embodiment, a partition (isolating means) 12 is disposed between the inverter panel 11 and the heat transfer wall portion 13 to define the flow passage F for the cooling water which cools the inverter U by heat exchange through the panel 11 in a first path between the panel wall 11 and the partition 12 and cools the oil by heat exchange with the oil through the heat transfer wall 13 (portion of case 10) in a second pass between the partition 12 and the heat transfer wall portion 13.

Figure 6:
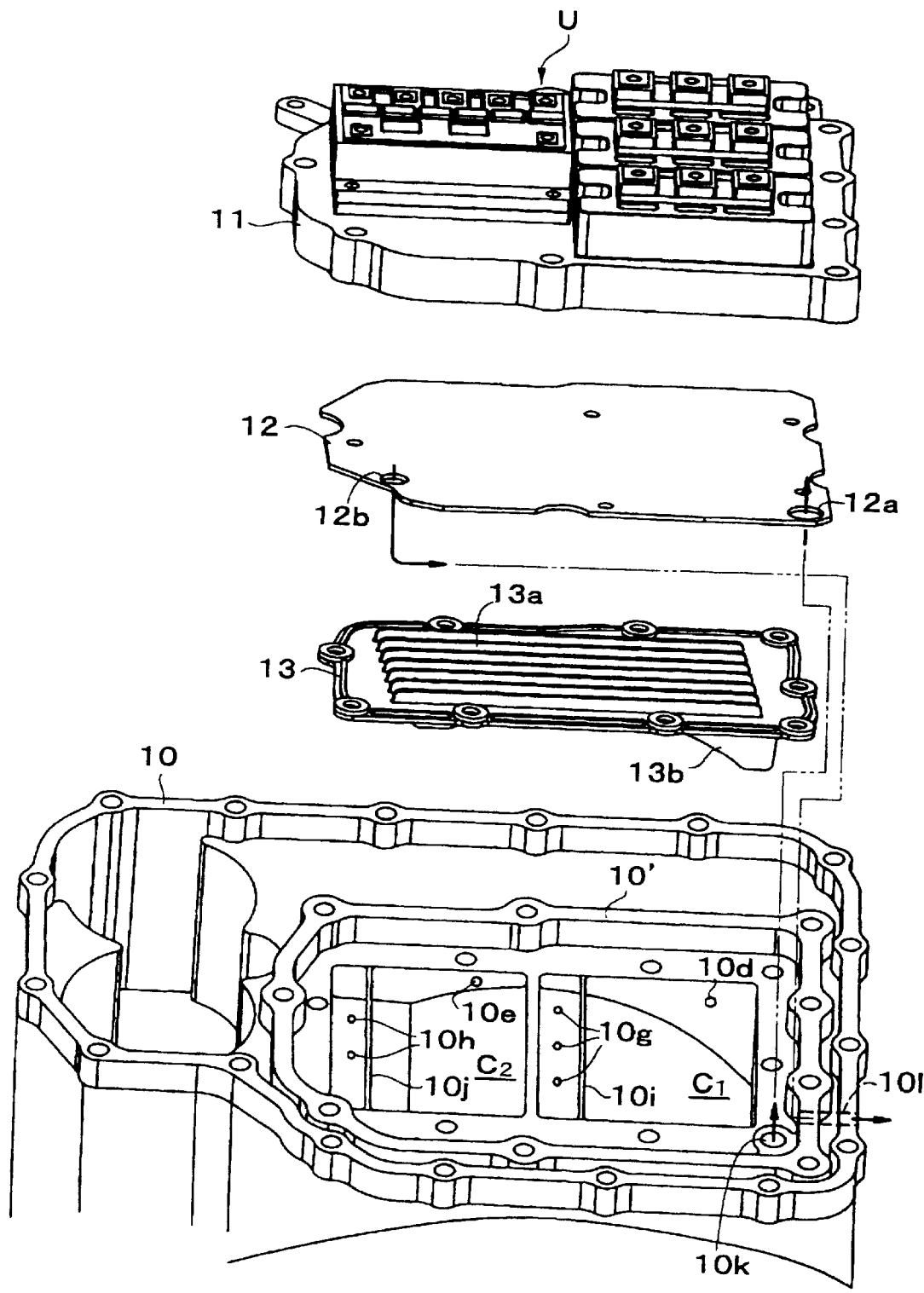
FIG. 6 is an exploded view showing the detailed construction of the first embodiment as viewed from above.
Figure 7:
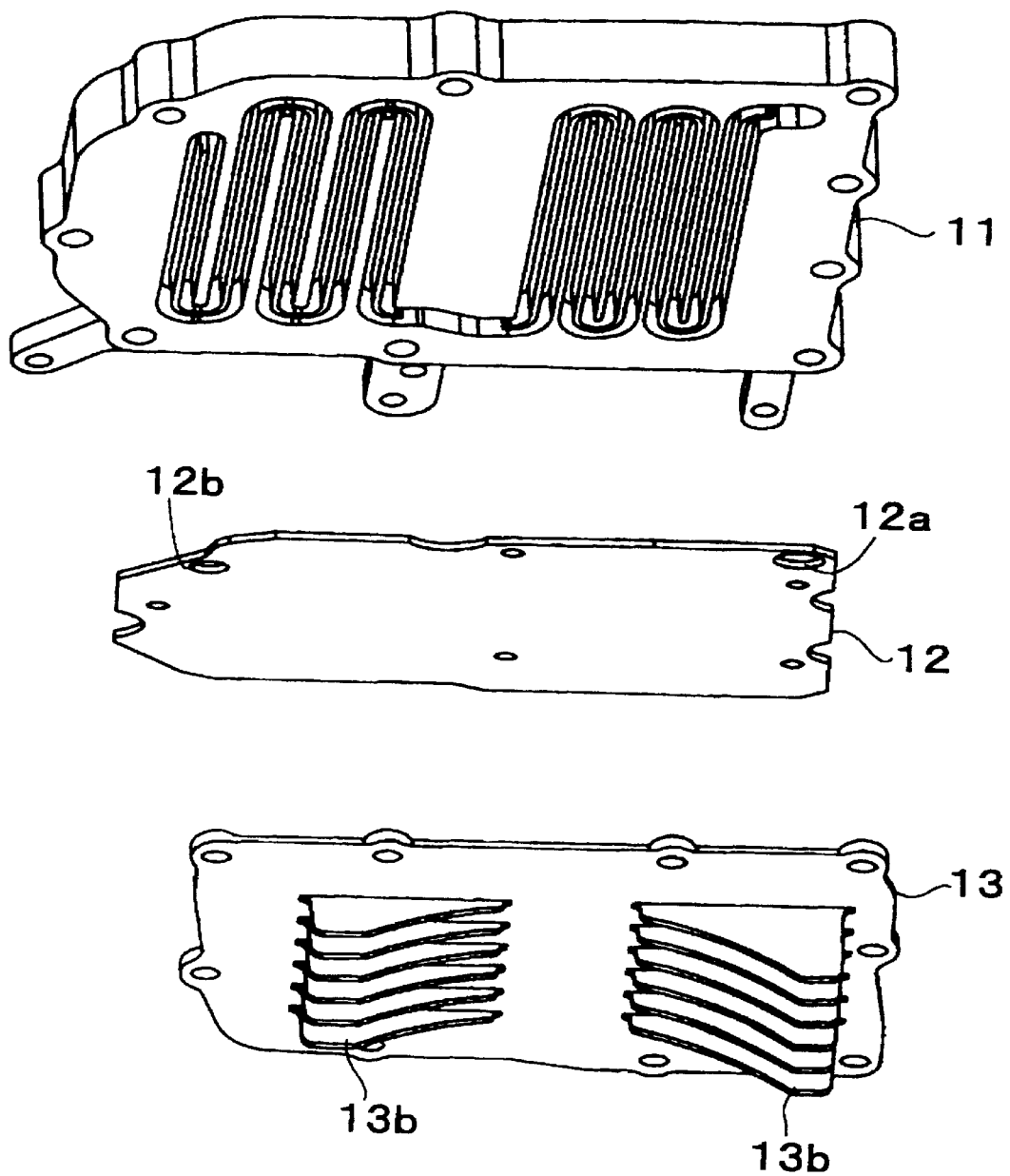
FIG. 7 is an exploded view showing a part of the components illustrated in FIG. 6 as viewed from below.
Figure 8:
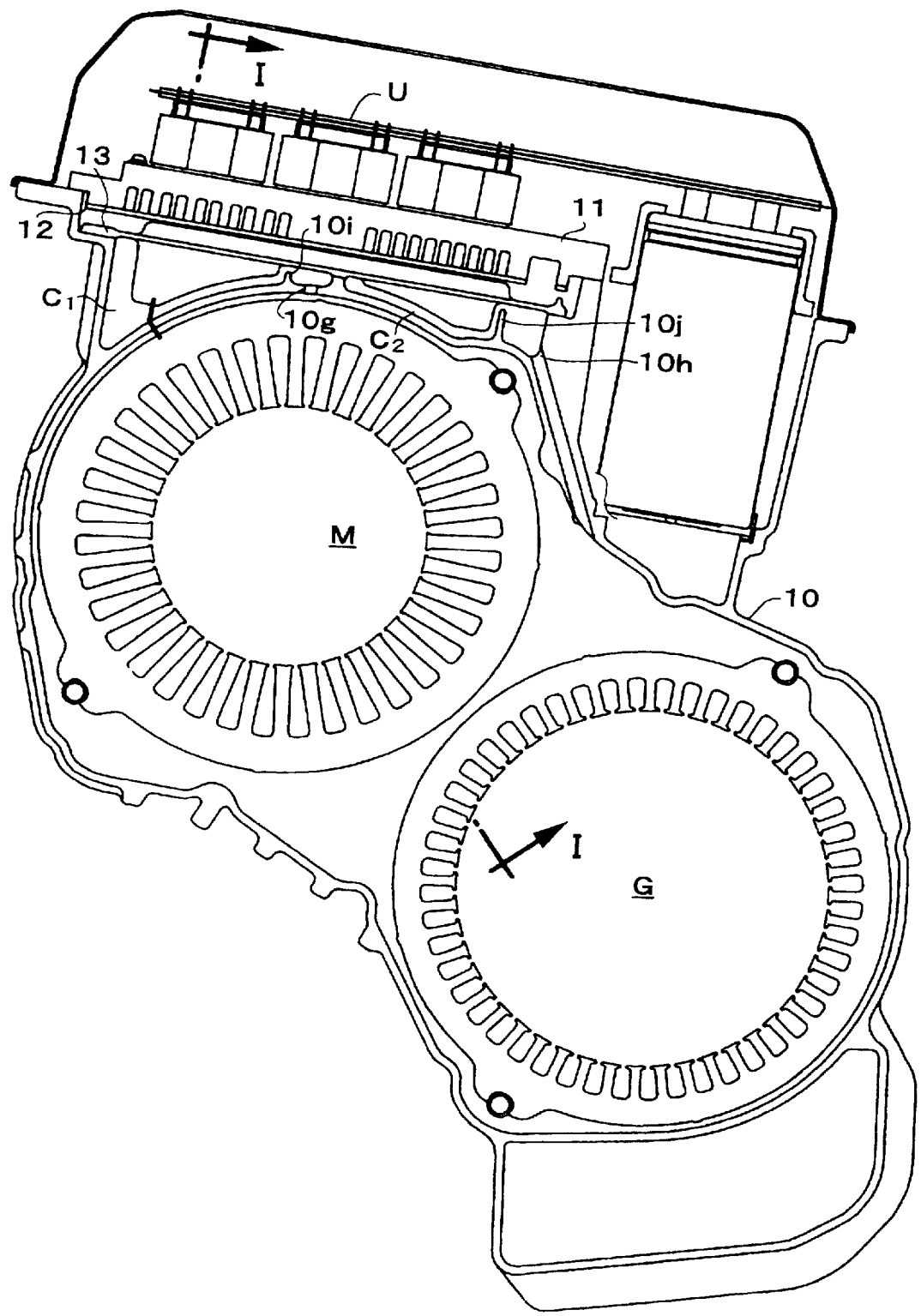
FIG. 8 is a sectional view showing details of the first embodiment.
Figure 9:
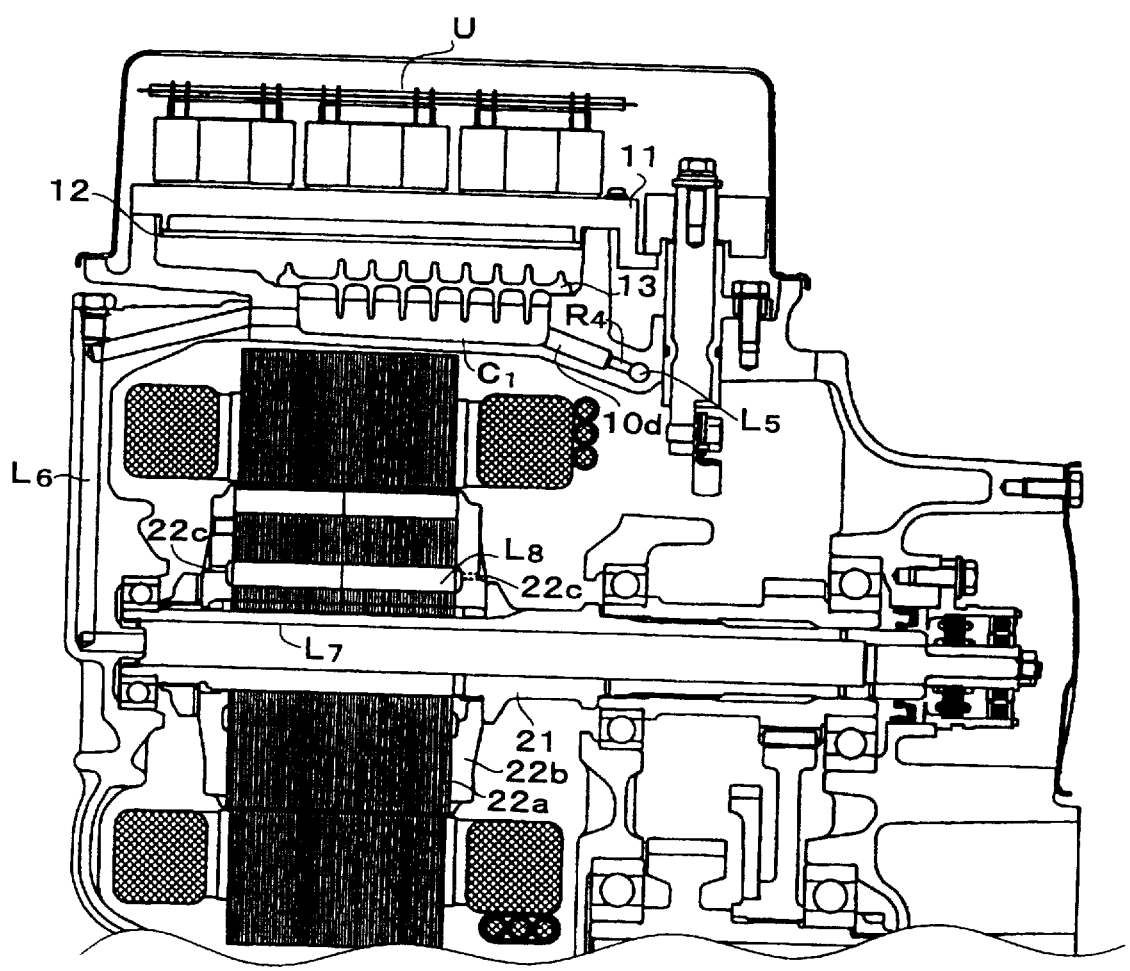
FIG. 9 is a sectional view taken along line I—I of FIG. 8.

FIG. 6 is an exploded perspective view showing details of the first embodiment inclusive of the drive unit case 10 and the power module forming the inverter U, FIG. 7 shows three of the same elements from beneath, and FIGS. 8 and 9 show the same structure assembled. In this embodiment, the coolant containers $C_1$, $C_2$ are provided on the upper part of the motor accommodating portion of the drive unit case 10. The coolant reservoir is divided into the coolant container $C_1$ for the motor and the coolant container $C_2$ for the generator. In the flow passage $L_5$ (see FIG. 3) for the first coolant leading to both of these coolant containers $C_1$, $C_2$ there are provided orifices $R_4$, $R_5$ having different apertures which distribute amounts of oil to both coolant containers $C_1$, $C_2$, according to the thermal loads of the motor M and the generator G, and those oil passages open at inlets 10d, 10e on the sides of the coolant containers. Dams 10i, 10j are provided in positions near the outlet sides of both coolant containers. Further, downstream of the dams 10i, 10j are formed oil outlets 10g, 10h which are open to the bottom faces of those coolant containers and which function as orifices for adjusting the discharge flow by the setting of the aperture.

As is illustrated in FIG. 9, the oil outlet 10g is connected to the intra-axial oil passage $L_7$ at the shaft end of the stator shaft 21 of the motor M, with the intra-case oil passage $L_6$ formed in the drive unit case utilized as the flow passage. The intra-axial oil passage $L_7$ communicates with the peripheral groove formed in end plates 22*b*, supporting ends of a core 22*a* of the motor M, through a radial oil hole. Received in the end plate peripheral grooves passes through a plurality of intra-rotor oil passages $L_8$, which communicate with the peripheral grooves of the two end plates. Intra-rotor oil passages $L_8$ extend through the core 22*a*, parallel to its axis and each ends at a discharge hole 22*c* formed in an end plate 22*b*. In the drawing, both ends of one intra-rotor oil passage $L_8$ are shown leading to the discharge holes 22*c*; however, actually, only one end of each intra-rotor oil passage $L_8$ leads to a discharge hole 22*c* in a left or right end plate, thereby preventing an imbalance in the amounts of oil running in rotor oil passages $L_8$. The oil outlet 10*h* extends above the stator of the generator G through the intra-case oil passage, as shown in FIG. 8.

The heat transfer wall portion 13 which closes the upper openings of the coolant containers $C_1$, $C_2$, is provided with a large number of cooling fins 13*a*, 13*b* on its upper face and lower face, respectively, and is constructed of an aluminum material or the like having good heat conductivity similar to the drive unit case 10. In this embodiment, the heat transfer wall 13 is an element independent from the drive unit 10, for convenience of machining, and is fixed to the drive unit case 10 with bolts or the like. The oil cooling fins 13*b* on the lower face of the heat transfer wall 13 vary in height so as to follow the shape of the bottom part of the coolant containers $C_1$, $C_2$ as shown in FIG. 8. The arrangement is such that the fins are positioned over the entire area of the coolant container $C_1$ so as to improve heat transfer.

The inverter panel 11, to which a power module forming the inverter U is fixed, serves as a heat sink for cooling the inverter U. As seen in FIG. 7, the inverter panel 11 is provided with two narrow flow passages in parallel passing therethrough and turning back and forth in serpentine fashion. In order to run cooling water as the second coolant through this flow passage, a partition sheet (isolating means) 12 is provided abutting against the lower face of the inverter panel 11. In this first embodiment, the isolating means 12 is a separate member, independent of the case and the partition wall, because it is formed of a material having a high insulating value. However, when the same material is used for the case and/or partition wall 11, it is possible to have the isolating means integral with either one of these members. Accordingly, as shown in FIG. 5, the first chamber $C_3$ contiguous with the inverter panel 11 and the second chamber $C_4$ contiguous with the drive unit case 10 are separated and defined by the partition (isolating means) 12 between the inverter panel 11 and the drive unit case 10 and the flow of the second coolant is first through chamber $C_3$, then through the connecting passage 12*b* and finally through chamber $C_4$.

In the unit of such a construction, the oil fed to the coolant containers $C_1$, $C_2$ from the respective inlets 10*d*, 10*e* is obstructed by the respective dams 10*i*, 10*j* and thereby held in chambers $C_1$, $C_2$ for a certain duration of time, after which it flows in contact with the oil cooling fins 13*b* on the lower face of the heat transfer wall 13 to effect sufficient heat exchange. Then, the amounts of oil overflowing the dams 10*i*, 10*j* are adjusted according to the demands for oil of the motor M and the generator G, respectively and discharged from the outlets 10*g*, 10*h*. Meanwhile, the cooling water passes through a hole 12*a* of the isolating means 12 from an inlet 10*k* open on the upper face of the drive unit case 10 into the heat sink of the inverter panel 11, i.e., the first chamber $C_4$, to provide sufficient heat exchange therein. Then, the cooling water flows through the communication passage 12*b*, formed as a hole in the isolating means 12 in this embodiment, and then across the heat transfer wall 13 while contacting with the water cooling fins 13*a* on the upper face of the heat transfer wall 13. The cooling water then leaves the drive unit case 10 through a cooling water outlet 101 formed in the surrounding wall around the opening of the coolant container. The cooling water discharged from the drive unit case 10 is cooled either by the radiator for cooling the engine or by a separate, dedicated cooler and then re-circulated.

Thus, according to the first embodiment described above, because the flow passages for coolant between the motor M and the inverter U are stacked as two layers, one on the motor M side and the other on the inverter U side, the cooling water which flows therethrough acts as two heat insulating layers, and it becomes possible to block the heat on the motor M side, which becomes hotter than the inverter U side, by absorbing it in two steps with the cooling water in the flow passage so that it becomes difficult for the heat from the motor to be transferred to the inverter U. As a result, it is possible to prevent the temperature of the inverter U from rising due to the integration of the motor M and the inverter U. Furthermore, as the isolating means 12 (a heat insulator) is disposed on the inverter panel 11, it resists heat transfer to the cooling water which flows through the first chamber $C_3$ on the inverter U side.

Furthermore, because the sequence is such that the cooling water first cools the power module forming the inverter U through the inverter panel 11 and then cools the motor M and the generator G through the oil, the cooling water does not conduct heat exchange directly with the motor M and the generator G or simultaneously with the inverter U. Therefore, it is possible to prevent the cooling water temperature from rising above the maximum temperature tolerated by the inverter U. Accordingly, it is possible to cool the inverter U, motor M, and generator G efficiently and thereby improve cooling performance. Also, because the flow passage for cooling water is formed in the space between the integrated inverter U and the drive unit case 10, a complicated conventional design, wherein an exclusive cooling channel is provided around the drive unit case, can be avoided, thus leading to an improvement in space efficiency and a reduction in cost. Furthermore, by separating the coolant reservoir into a coolant reservoir $C_1$ for the motor and a coolant reservoir $C_2$ for the generator, it becomes possible to individually adjust the amounts of oil to be supplied to the motor M and the generator G, respectively, from the coolant reservoir. Accordingly, by adjusting the flow ratio with the orifices $R_4$, $R_5$, having different apertures, and supplying the proper amounts of oil to the motor M and the generator G, both can be efficiently cooled according to their cooling requirements. Furthermore, as the oil after heat exchange in the coolant reservoirs $C_1$, $C_2$ is fed to the rotor side of the motor M and to the generator G and also used for cooling from the inner peripheral side by discharge from the rotor by centrifugal force, the stators 20, 30, are also cooled so that highly efficient motor cooling can be achieved by utilizing oil circulation to the utmost extent.

Figure 10:
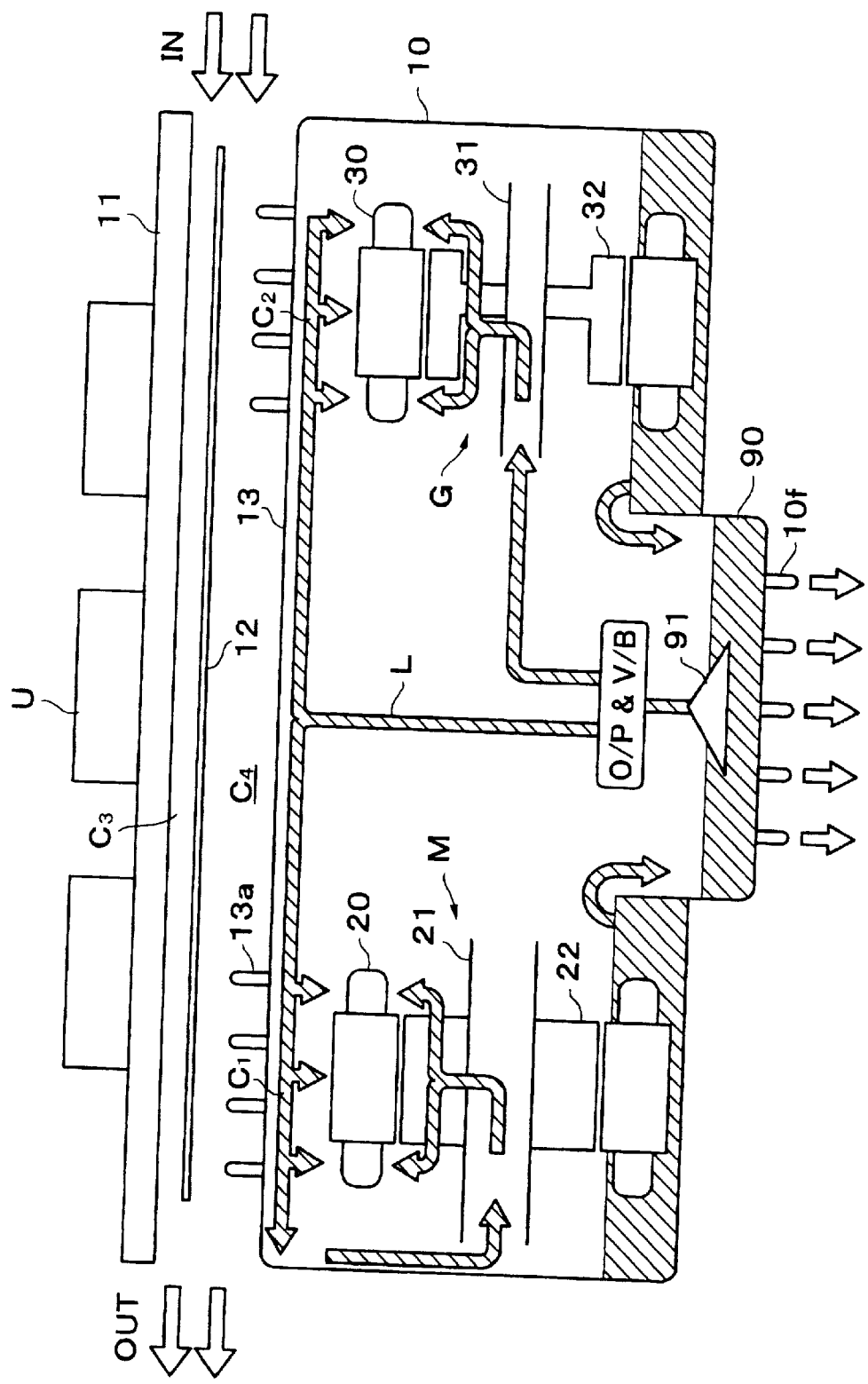
FIG. 10 is a schematic diagram showing, conceptually, a cooling system of a second embodiment of the present invention.

In this first embodiment, the flow of the cooling water as the second coolant through the first chamber $C_3$ on the inverter side is reversed in directed for flow through the second chamber $C_4$ on the coolant container side, as illustrated most clearly in FIG. 5, so that these flows are countercurrent. FIG. 10 shows a second embodiment as a schematic diagram similar to that of FIG. 5. In this second embodiment, the first chamber $C_3$ on the partition wall 11 side and the second chamber $C_4$ on the circulating passage L side, i.e., in contact with the heat transfer wall 13, which are divided by the isolating means 12, are connected in parallel with the circulating passage for second coolant. Since the remainder of the second embodiment is substantially the same as the first embodiment described above, all corresponding members are indicated by the same reference numerals and are not again described.

With this second embodiment, because the cooling water flows through the first chamber $C_3$ and the second chamber $C_4$ are independent, the heat of the motor M is prevented from being transferred to the inverter U through the cooling water. Moreover, since it is possible to run the cooling water at a lower temperature to the second chamber $C_4$ side facing the heat transfer wall 13 portion, the cooling efficiency of the motor M and the generator G can be further improved.

Figure 11:
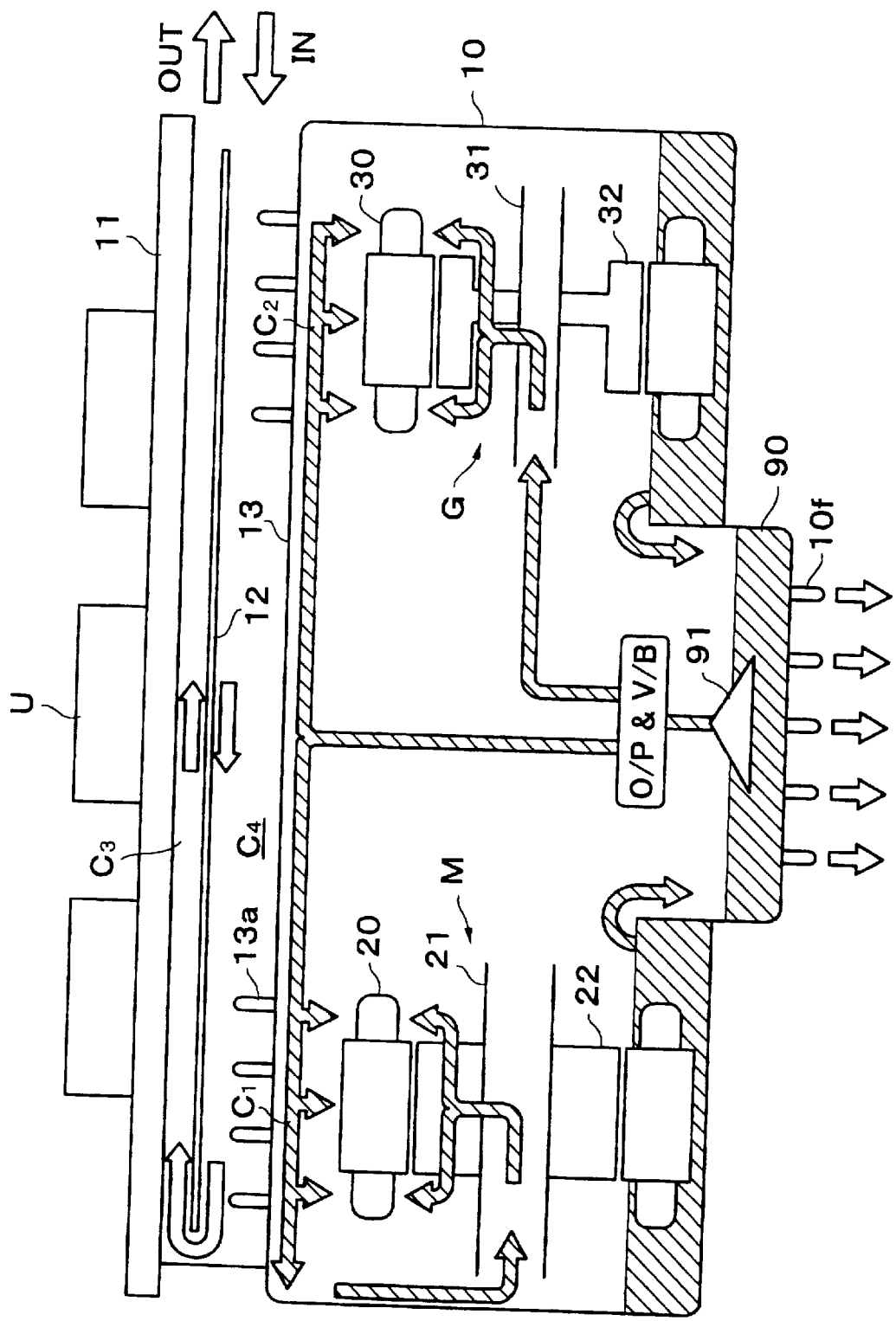
FIG. 11 is a schematic diagram showing, conceptually, a cooling system of a third embodiment of the present invention.

Next, FIG. 11 shows a third embodiment wherein the flow of cooling water the first and second chambers $C_3$ and $C_4$ are the reverse of the flow pattern of the first embodiment (FIG. 5). In this embodiment, the cooling water as the second coolant first flows through the second chamber $C_4$ to cool the oil through the heat transfer wall portion 13. Then it flows through the first chamber $C_3$ to cool the power module of the inverter U.

In this third embodiment the cooling water (second coolant) does not directly cool the motor M and the generator G but, rather, cools the oil which, in turn, circulates around the motor and generator, and cools them. Therefore, the heat from the motor M and the generator G is reduced by heat exchange with the cooling water through the oil, as opposed to direct heat transfer, whereby an advantage is gained in that it is possible to prevent the temperature of the cooling water from rising above the maximum which can be tolerated by the inverter U.

Figure 12:
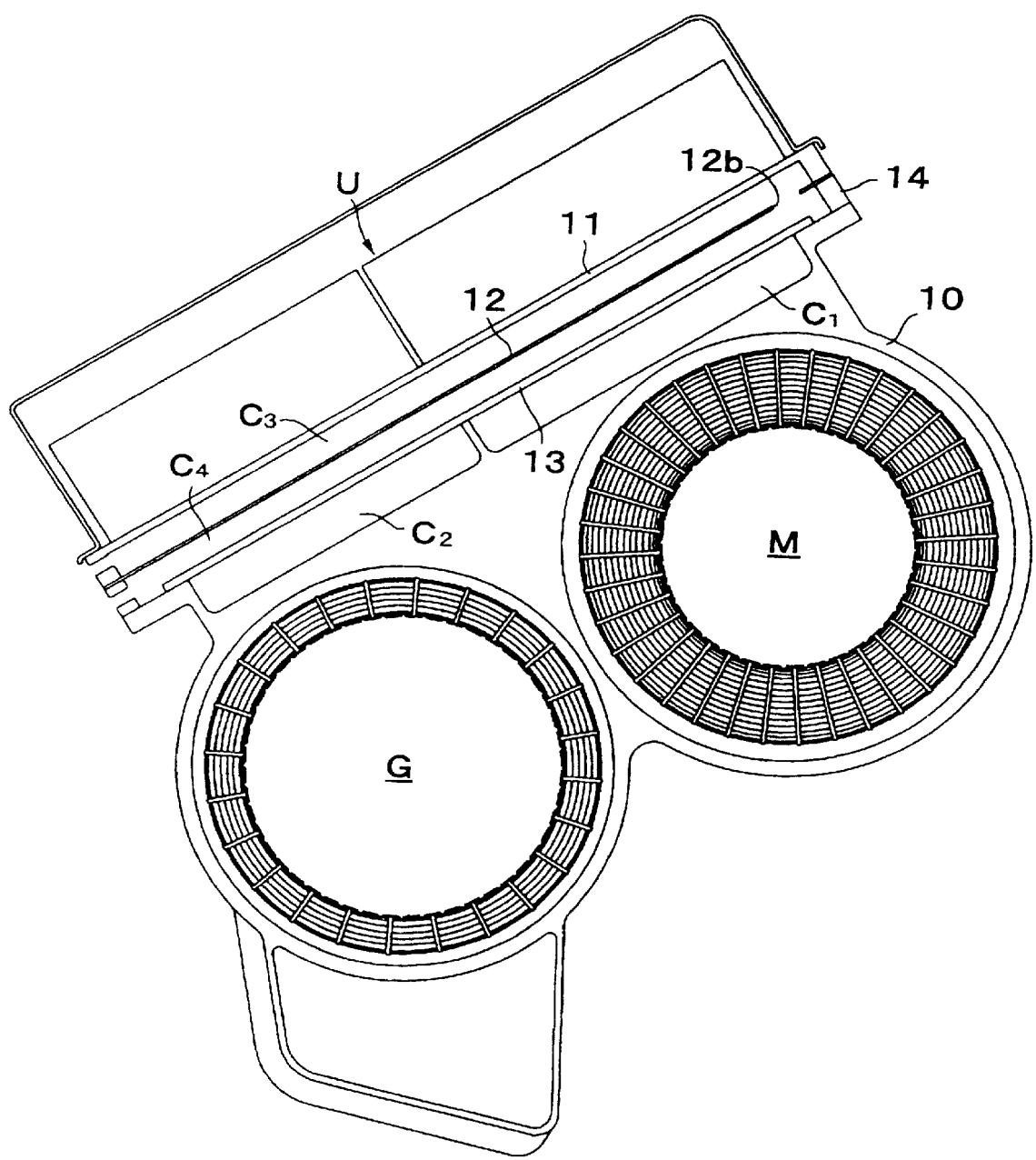
FIG. 12 is a cross-sectional view of a fourth embodiment of the present invention.

FIG. 12 shows a fourth embodiment wherein the structures of the members defining the water flow passage have been modified relative to corresponding structures of the first and second embodiments. In this fourth embodiment, an independent surrounding wall member 14 is interposed between the drive unit case 10 and the inverter panel wall 11, and further, an independent isolating means 12 is interposed between the inverter panel 11 and the case wall portion 13. The surrounding wall member 14 may also be constructed of aluminum, an aluminum alloy, or the like, i.e., the same types of materials used for the drive unit case 10 and the inverter panel 11, or may be constructed of a material having a high heat insulating value of the same type as that of the isolating means 12. Further, in this embodiment, the first and second coolant containers $C_1$, $C_2$ are located above, respectively, the motor M and the generator G.

In this embodiment also, because the isolating means 12 is an independent member and is disposed between the drive unit case 10 and the inverter panel 11, heat can not be directly transferred to the inverter panel 11 from the drive unit case 10 through their connecting portions.

Figure 13:
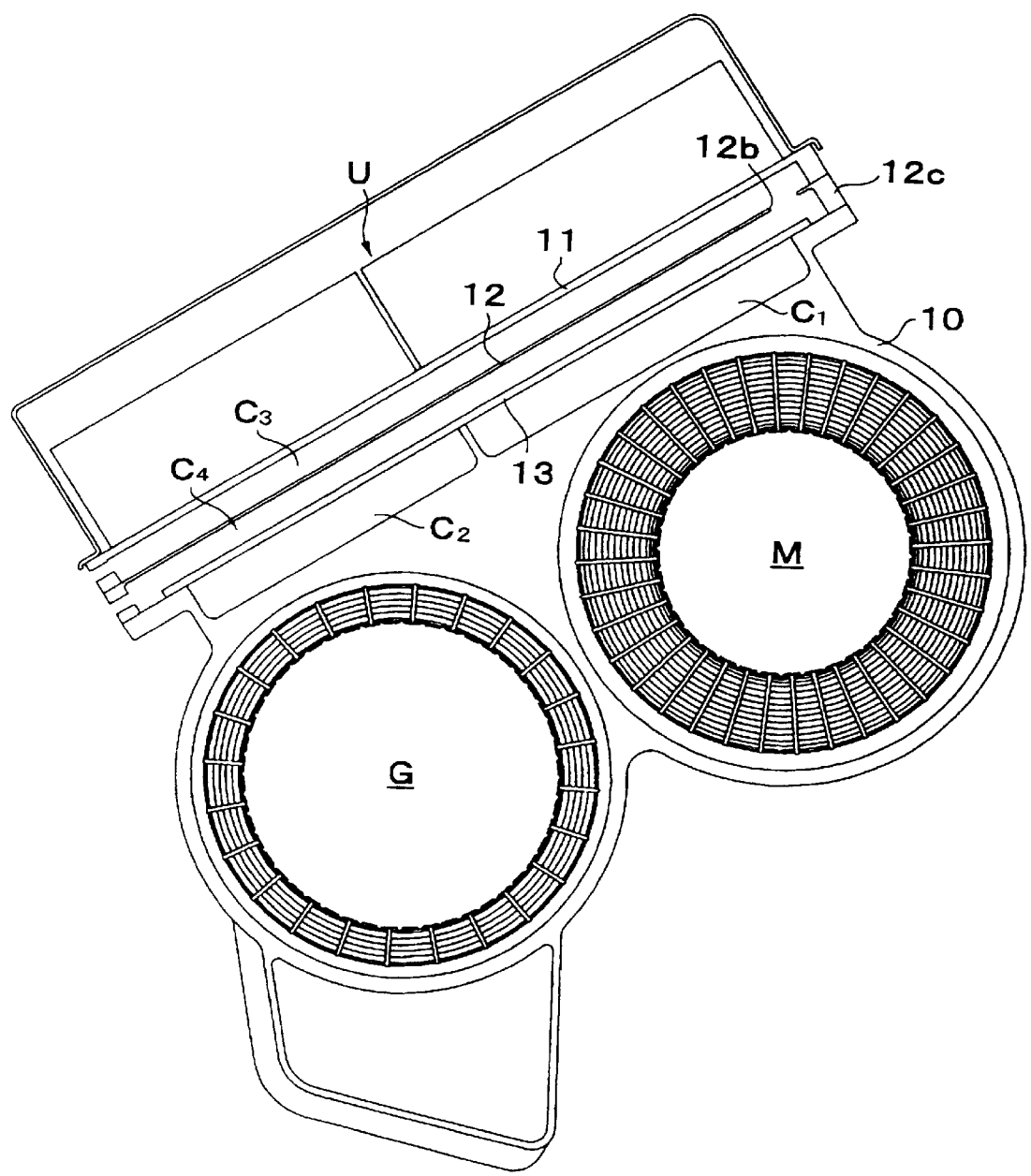
FIG. 13 is a cross-sectional view of a fifth embodiment of the present invention.

FIG. 13 shows a fifth embodiment wherein the structures of the members forming the flow passage have been modified relative to the first and third embodiments. In this fifth embodiment, as in the previously described embodiments, an independent isolating means 12 is interposed between the inverter panel 11 and the drive unit case 10. However, unlike the previous embodiments, the isolating means 12 in this embodiment is provided with an integral surrounding wall portion 12c which serves to connect the drive unit case 10 with the inverter panel 11. In this embodiment also, because the highly heat insulating isolating means 12 is disposed between the drive unit case 10 and the inverter panel 11, heat can not be directly transferred to the partition wall 11 from the drive unit case 10 through their connecting portions.

Figure 14:
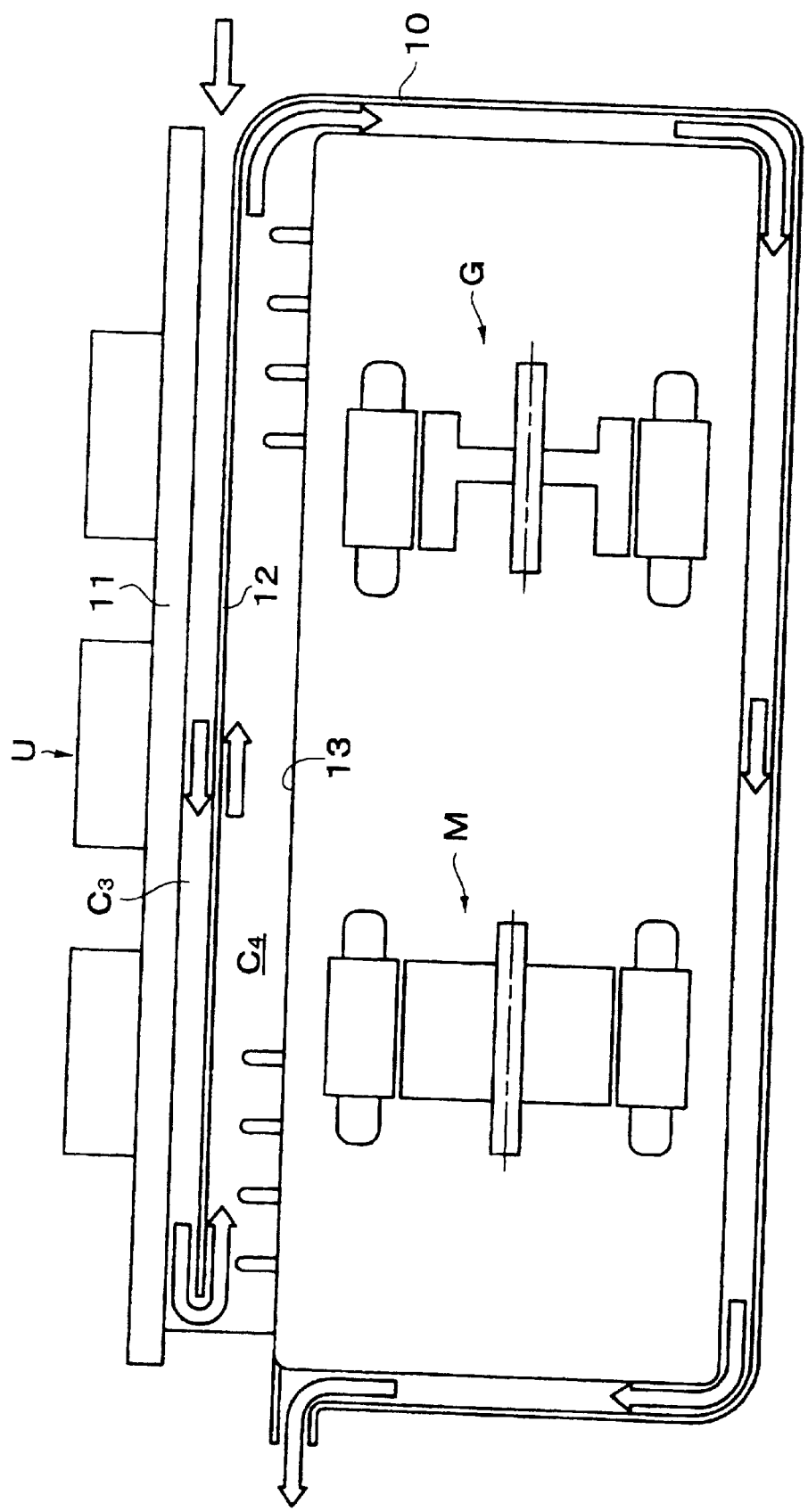
FIG. 14 is a schematic diagram showing, conceptually, a cooling system of a sixth embodiment of the present invention.
Figure 15:
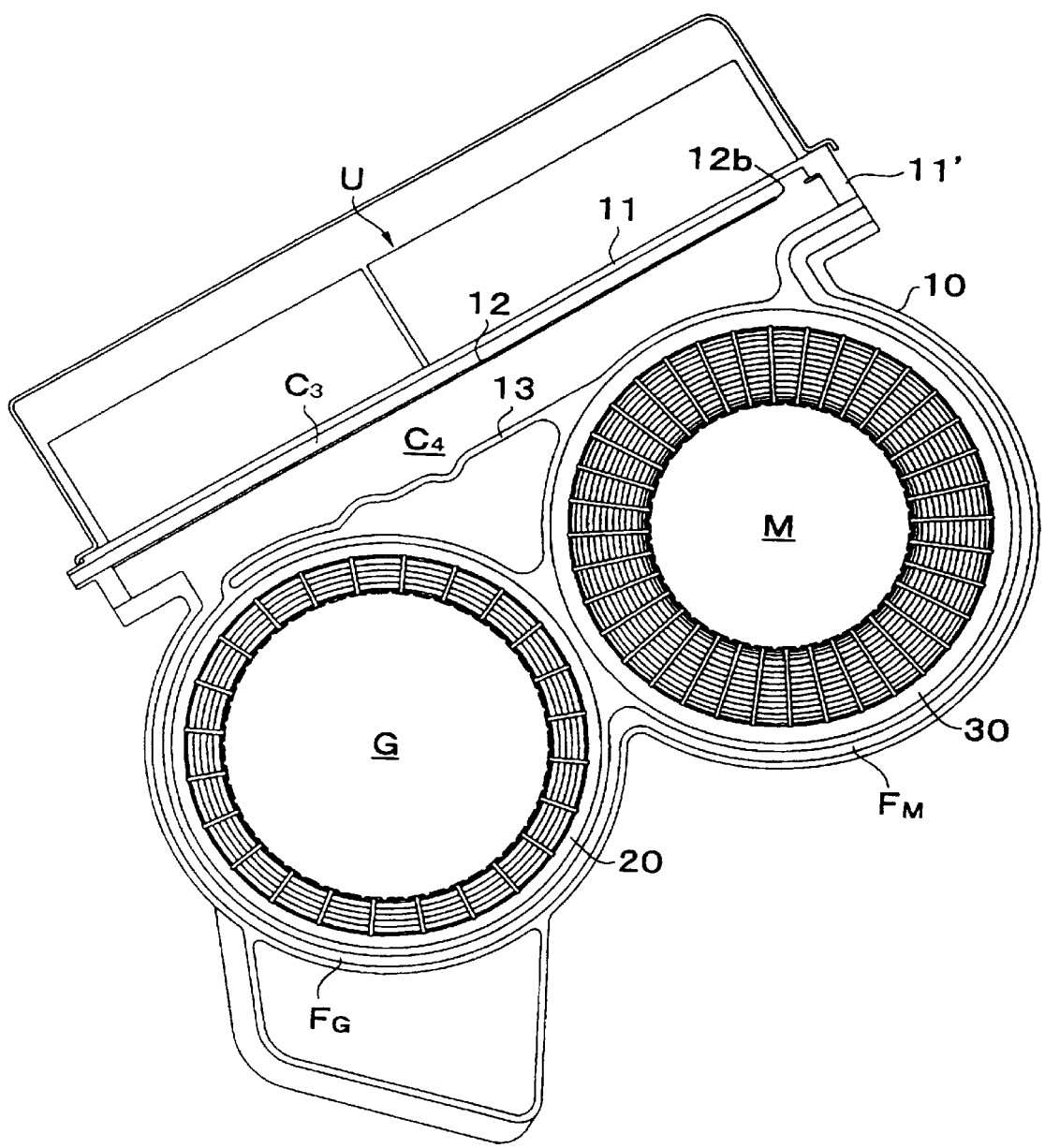
FIG. 15 is a cross-sectional view of a flow passage in the sixth embodiment.

Although, in each embodiment described above oil is used as a coolant for directly cooling the motor M and the generator G, and secondary cooling of the oil is with cooling water as a second coolant for cooling the inverter U, the present invention can also be embodied as a system for cooling the motor M, the generator G. and the inverter U with a single coolant. FIG. 14 and FIG. 15 show a sixth embodiment using this type of cooling system. As illustrated in FIG. 14, in this sixth embodiment, the downstream side of the flow passage passing through the first and second chambers $C_3$, $C_4$ communicates with a flow passage in the drive unit case 10 for cooling the motor M and the generator G.

As illustrated by the cross-section in FIG. 15, the partition wall 11 in this embodiment is constructed in the shape of a lid covering the drive unit case 10 and containing the first chamber $C_3$ and the second chamber $C_4$, i.e., in a shape having a surrounding wall 11' extending therefrom, and the isolating means 12 which separates the first chamber $C_3$ and the second chamber $C_4$ is disposed on the side of the inverter panel 11. The isolating means 12 in this case may be independent from the inverter panel 11, as illustrated in the figure, or may be integrated with the inverter panel 11. In this embodiment, the first chamber $C_3$ and the second chamber $C_4$ are separated by the isolating means 12 which is disposed nearer to the inverter U than to the junction interface between partition wall 11' and the drive unit case 10. The downstream side of the flow passage passing through the first and second chambers $C_3$, $C_4$ communicates with a flow passage in the wall of the drive unit case 10, where it first passes through a flow passage $F_G$ formed along the outer periphery of the stator 20 of the generator G, then passes through a flow passage $F_M$ formed along the outer periphery of the stator 30 of the motor M, and finally exits an outlet located adjacent to the junction of wall 11' and the drive unit case 10.

In this sixth embodiment, the flow passage for the cooling water between the drive unit case 10 and the inverter panel 11 can be located mainly on the inverter side, so that the structure of the drive unit case 10 can be simplified and the inverter U, the motor M, and the generator G can be cooled with a simple structure. Also, because the partition 12 is on the inverter side, it inhibits transfer of heat from the motor M and the generator G to the coolant which flows through the first chamber $C_3$ on the inverter side. Moreover, because the partition 12 is closer to the inverter side than to the junction of the drive unit case 10 and the partition wall 11', with the partition wall 11' extending beyond the partition 12 toward the motor M and the generator G, the heat capacity of the partition wall 11 is thereby increased.

Figure 16:
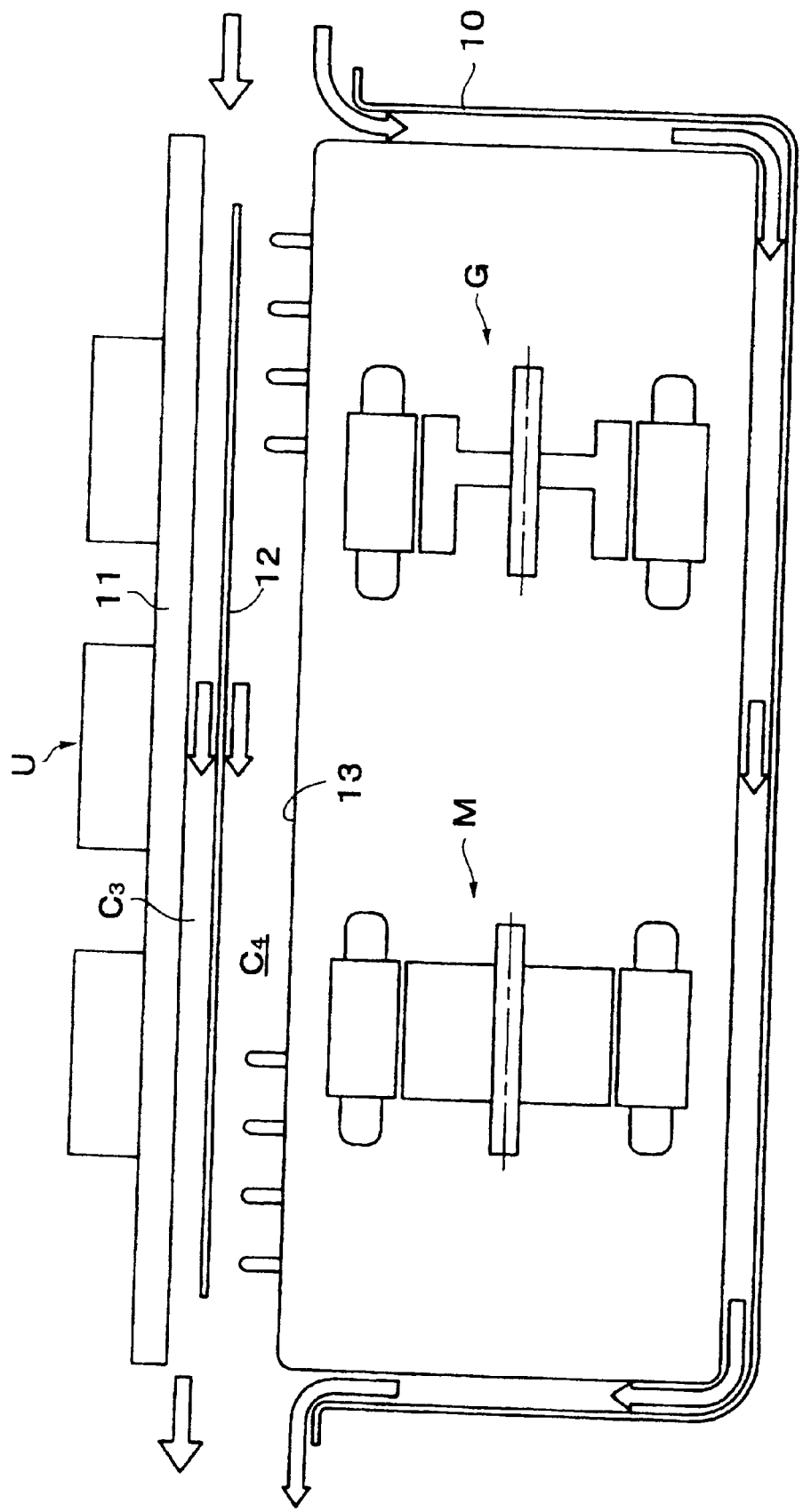
FIG. 16 is a schematic diagram showing, conceptually, a cooling system of a seventh embodiment of the present invention.

The foregoing embodiment wherein motor M, the generator G, and the inverter U are cooled with a single coolant, can also be modified with respect to the flow pattern through the first and the second chambers $C_3$, $C_4$. FIG. 16 shows such a modification as a seventh embodiment wherein the first chamber $C_3$ and the second chamber $C_4$ are arranged in parallel. In this seventh embodiment, a flow passage is formed in the wall of the drive unit case similar to that of the aforementioned sixth embodiment, and this flow passage communicates with the flow passage which feeds coolant in a parallel relationship through the first and the second chambers $C_3$, $C_4$.

Figure 17:
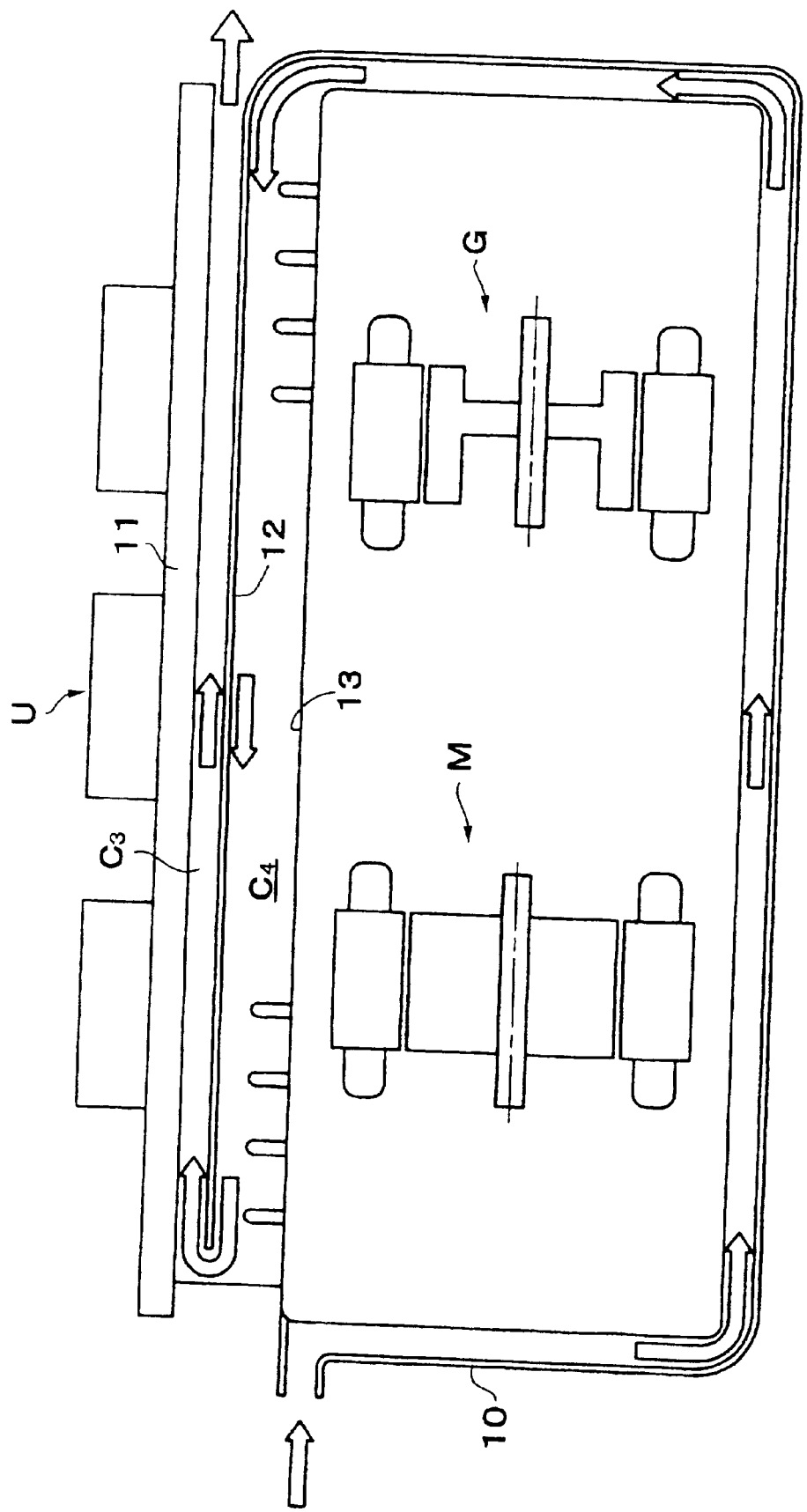
FIG. 17 is a schematic diagram showing, conceptually, a cooling system of an eighth embodiment of the present invention.

Lastly, FIG. 17 shows an eighth embodiment wherein the coolant flow through the first chamber $C_3$ and the second chamber $C_4$ is the reverse of that of the sixth embodiment (FIGS. 14 and 15). In this eighth embodiment as well, a flow passage is formed in the wall of the drive unit case similar to that of the aforementioned sixth embodiment, and this flow passage communicates with the upstream side of the flow passage passing through the first and the second chambers $C_3$, $C_4$ in series. In this embodiment, the cooling water first undergoes heat exchange with the motor M and the generator G through the drive unit case 10 wall as it flows through the flow passage in the wall of the case 10. It then undergoes heat exchange with the motor M and the generator G through the heat transfer wall as it flows through the second chamber $C_4$ and, finally, undergoes heat exchange with the power module of the inverter U through the inverter panel 11 as it flows through the first chamber $C_3$.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. For example, in each of the aforementioned embodiments, while the second coolant is described as water, a different appropriate coolant may be used.

What is claimed is:

1. A drive unit comprising:

an electric motor;

a drive unit case housing said electric motor, said case including a heat transfer wall portion for cooling a coolant circulated within said case;

an inverter, fixed to a panel for controlling said electric motor, said panel being fixed to and spaced from said heat transfer wall portion to define a space therebetween;

a partition dividing said space into a first chamber on the side of the inverter and a second chamber on the side of said case; and at least one coolant port for introduction of coolant into said first and second chambers and for circulating coolant therethrough.

2. The drive unit according to claim 1, wherein the partition is a separate member mounted to said panel.

3. The drive unit according to claim 2, wherein said first and second chambers are interconnected in series by a communication passage for serial flow of coolant therethrough, with said first chamber disposed upstream of said second chamber.

4. The drive unit according to claim 3, wherein said partition is an independent member which prevents contact between said panel and said drive unit case.

5. The drive unit according to claim 2, wherein said partition is formed of heat insulating material.

6. The drive unit according to claim 2, wherein said first chamber and said second chamber communicate in parallel with said one coolant port for separate flows of coolant, in parallel, therethrough.

7. The drive unit according to claim 6, wherein said partition is an independent member which prevents contact between said panel and said drive unit case.

8. The drive unit according to claim 1, wherein said partition is an independent member which prevents contact between said panel and said drive unit case.

9. The drive unit according to claim 8, wherein said partition is formed of heat insulating material.

10. The drive unit according to claim 1, wherein said panel is constructed as a lid which contains the first chamber and the second chamber and which covers the drive unit case, and said partition is mounted within said panel.

11. The drive unit according to claim 1, wherein said panel is constructed as a lid which contains the first chamber and which covers the drive unit case, and wherein said partition is supported between the drive unit case and said panel so as to prevent contact between connecting portions of the drive unit case and the panel.

12. The drive unit according to claim 1, wherein said partition is disposed nearer to the inverter than to the abutting faces of the panel and the drive unit case.

13. The drive unit according to claim 1, wherein said first and second chambers are interconnected in series by a communication passage for serial flow of coolant therethrough, with said first chamber disposed upstream of said second chamber.

14. The drive unit according to claim 1, wherein said first chamber and said second chamber communicate in parallel with said one coolant port for separate flows of coolant, in parallel, therethrough.

* * * * *